United States Patent
Saito et al.

(10) Patent No.: US 9,525,581 B2
(45) Date of Patent: Dec. 20, 2016

(54) WIRELESS COMMUNICATION DEVICE AND MALFUNCTION DETERMINING METHOD

(71) Applicant: Panasonic Intellectual Property Management Co., Ltd., Osaka (JP)

(72) Inventors: Noriaki Saito, Tokyo (JP); Kenji Miyanaga, Kanagawa (JP); Shigeki Nakamura, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/018,864

(22) Filed: Feb. 8, 2016

(65) Prior Publication Data

US 2016/0285669 A1    Sep. 29, 2016

(30) Foreign Application Priority Data

Mar. 24, 2015   (JP) .................................. 2015-061214

(51) Int. Cl.
*H04L 27/34* (2006.01)
*H04L 27/36* (2006.01)
*H04L 27/20* (2006.01)

(52) U.S. Cl.
CPC .......... *H04L 27/362* (2013.01); *H04L 27/206* (2013.01)

(58) Field of Classification Search
USPC .......... 375/298, 260, 261; 455/84, 102, 313
See application file for complete search history.

(56) References Cited

U.S. PATENT DOCUMENTS

| | | | | |
|---|---|---|---|---|
| 5,771,263 A | * | 6/1998 | Kanazawa | H03C 3/406 332/103 |
| 8,116,717 B2 | * | 2/2012 | Kuo | H03C 3/406 455/313 |
| 2004/0250192 A1 | * | 12/2004 | Kanazawa | H04L 27/0014 714/746 |
| 2009/0140787 A1 | * | 6/2009 | Shiratsuchi | H04L 27/364 327/254 |
| 2009/0161778 A1 | * | 6/2009 | Okada | H03C 3/406 375/260 |
| 2010/0313094 A1 | | 12/2010 | Kubota | |
| 2015/0156054 A1 | * | 6/2015 | Hirano | H04L 27/364 455/102 |
| 2015/0163086 A1 | * | 6/2015 | Saito | H04L 27/3405 375/298 |
| 2015/0333850 A1 | * | 11/2015 | Myoung | H04B 17/11 455/84 |

FOREIGN PATENT DOCUMENTS

| | | |
|---|---|---|
| JP | 2010-283589 | 12/2010 |
| JP | 2013-090003 | 5/2013 |

* cited by examiner

*Primary Examiner* — Eva Puente
(74) *Attorney, Agent, or Firm* — Seed IP Law Group LLP (57) ABSTRACT

In signal processing of the present disclosure, an abnormal correction value as a correction value for correcting a quadrature error that occurs in quadrature modulation is output in malfunction determining processing, and a normal correction value as the correction value is output in calibration processing. The presence or absence of malfunction in the signal processing is determined on the basis of the levels of carrier leak and image leak of the quadrature modulated signal.

12 Claims, 7 Drawing Sheets

WIRELESS COMMUNICATION DEVICE AND MALFUNCTION DETERMINING METHOD

BACKGROUND

1. Technical Field

The present disclosure relates to a signal processing device that corrects a quadrature error that occurs in quadrature modulation of a signal and a malfunction determining method.

2. Description of the Related Art

In recent years, development of a wireless communication device using quadrature modulation has been rapidly progressing along with miniaturization of a CMOS process in techniques such as millimeter-wave communication using a 60 GHz band and millimeter-wave radar using a 77 GHz to 81 GHz band. When a signal is quadrature-modulated in the wireless communication device, carrier leak and image leak occur due to a differential and a quadrature error. Since a millimeter-wave signal has higher sensitivity to a variation that occurs in a production process and has a larger differential and a larger quadrature error than a conventional microwave band signal, it is difficult for a conventional wireless communication device to suppress carrier leak and image leak.

Japanese Unexamined Patent Application Publication No. 2010-283589 discloses a communication device that quantizes a power envelope signal which is a microwave band transmission wave by using an ADC (Analog Digital Converter) and detects a frequency component thereof by using FFT (Fast Fourier Transform).

One example of means for suppressing carrier leak and image leak is application of the arrangement disclosed in Japanese Unexamined Patent Application Publication No. 2010-283589. However, in Japanese Unexamined Patent Application Publication No. 2010-283589, it is difficult to detect a signal whose level is below a detection limit of the ADC, and it is therefore difficult to distinguish a case where the level of a quadrature error falls below the detection limit due to proper correction of the quadrature error and a case where the quadrature error is not detected because of malfunction of a power detector and peripheral circuits thereof that correct the quadrature error.

SUMMARY

One non-limiting and exemplary embodiment provides a signal processing device and a malfunction determining method that can distinguish a case where an output level of a quadrature error is low due to proper correction of the quadrature error and a case where it is difficult to detect a quadrature error due to malfunction of a function of correcting a quadrature error.

In one general aspect, the techniques disclosed here feature a signal processing device including: a generator that generates a quadrature modulated signal by correcting a modulated signal using a correction value, the correction value being one of a first correction value that suppresses a quadrature error and a second correction value that causes the quadrature error; a detector that detects the quadrature error of the quadrature modulated signal; and malfunction determination circuitry that determines presence or absence of malfunction of the detector on the basis of a level of the quadrature error.

According to the present disclosure, it is possible to distinguish a case where an output level of a quadrature error is low due to proper correction of the quadrature error and a case where it is difficult to detect a quadrature error due to malfunction of a function of correcting a quadrature error.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiment of the present disclosure are described below in detail with reference to the drawings as appropriate.

Embodiment 1

Configuration of Wireless Communication Device

A configuration of a wireless communication device 100 that serves as a signal processing device according to Embodiment 1 of the present disclosure is described below in detail with reference to FIG. 1.

The wireless communication device 100 according to the present embodiment executes malfunction determining processing for determining the presence or absence of malfunction of a correction function of correcting carrier leak and image leak at the time of activation. When a determination result indicating the absence of malfunction is obtained in the malfunction determining processing, the wireless communication device 100 performs calibration processing for performing correction suppressing carrier leak and image leak. The wireless communication device 100 is typically a device that transmits and receives a millimeter-wave signal. The carrier leak and image leak are undesirable signal components that are generated due to a differential error and a quadrature error, respectively.

The wireless communication device 100 includes a digital modulated signal generator 101, DACs (Digital Analog Converter) 102 and 103, amplifiers 104 and 105, an oscillator 106, a phase shifter 107, a quadrature modulator 108, an amplifier 109, a coupler 110, an antenna 111, a wave detector 112, an amplifier 113, an ADC (Analog Digital Converter) 114, an FFT (Fast Fourier Transform) unit 115, a switching control unit 116, a switch 117, a malfunction determining unit 118, a correction amount calculating unit 119, an abnormal correction value storage unit 120, a normal correction value storage unit 121, a switch 122, and a correction circuit 123. The FFT unit 115, the malfunction determining unit 118, and the correction amount calculating unit 119 constitute a correction calculation processing unit 150. The correction calculation processing unit 150 determines the presence or absence of malfunction by detecting carrier leak and image leak and calculates a correction amount for correcting the carrier leak and the image leak.

In the present embodiment, mainly the digital modulated signal generator 101, the DACs (Digital Analog Converter) 102 and 103, and the quadrature modulator 108 constitute a generator, and mainly the wave detector 112, the ADC (Analog Digital Converter) 114, and the FFT unit 115 constitute a detector.

The digital modulated signal generator 101 generates a modulated signal (tone signal) by performing digital modulation of a carrier wave by using a continuous wave CW of a frequency fm. The digital modulated signal generator 101 corrects input levels of the carrier leak and the image leak to the ADC 114 by using a correction value determined by the correction circuit 123.

Note that at the time of execution of the malfunction determining processing, carrier leak and image leak of the modulated signal that has been corrected exceed an output level of the ADC 114 that is expected during normal operation. Note also that at the time of the calibration processing, the modulated signal that has been corrected is a modulated signal in which carrier leak and image leak are suppressed.

The digital modulated signal generator 101 supplies an I component of the generated modulated signal to the DAC 102 and supplies a Q component of the generated modulated signal to the DAC 103.

The DAC 102 generates an analog signal of the I component by digital/analog conversion (hereinafter referred to as "DA conversion") of the I component of the modulated signal supplied from the digital modulated signal generator 101. The DAC 102 supplies the generated analog signal of the I component to the amplifier 104.

The DAC 103 generates an analog signal of the Q component by DA conversion of the Q component of the modulated signal supplied from the digital modulated signal generator 101. The DAC 103 supplies the generated analog signal of the Q component to the amplifier 105.

The amplifier 104 amplifies the analog signal of the I component supplied from the DAC 102 and then supplies the amplified analog signal of the I component to the quadrature modulator 108. The amplifier 105 amplifies the analog signal of the Q component supplied from the DAC 103 and then supplies the amplified analog signal of the Q component to the quadrature modulator 108.

The oscillator 106 generates oscillation signals of a predetermined frequency and then supplies the generated oscillation signals to the phase shifter 107. The phase shifter 107 shifts the phases of the oscillation signals supplied from the oscillator 106 by 90 degrees and then supplies the oscillation signals to the quadrature modulator 108.

The quadrature modulator 108 generates a quadrature modulated signal by performing quadrature modulation of the I component of the modulated signal supplied from the amplifier 104 and the Q component of the modulated signal supplied from the amplifier 105 by using the oscillation signals whose phases differ by 90 degrees supplied from the phase shifter 107. The quadrature modulator 108 supplies the generated quadrature modulated signal to the amplifier 109.

The amplifier 109 amplifies the quadrature modulated signal supplied from the quadrature modulator 108 and then supplies the amplified quadrature modulated signal to the coupler 110.

The coupler 110 separates the quadrature modulated signal supplied from the amplifier 109, and the coupler 110 wirelessly transmits one of the separated quadrature modulated signals via the antenna 111 and supplies the other one of the separated quadrature modulated signals to the wave detector 112.

The wave detector 112 acquires an amplitude fluctuation component by detecting the quadrature modulated signal supplied from the coupler 110 and then supplies the acquired amplitude fluctuation component to the amplifier 113. The wave detector 112 is typically an envelope wave detector that performs envelope wave detection.

The amplifier 113 amplifies the amplitude fluctuation component supplied from the wave detector 112 and then supplies the amplified amplitude fluctuation component to the ADC 114.

The ADC 114 performs analog/digital conversion (hereinafter referred to as "AD conversion") of the amplitude fluctuation component supplied from the amplifier 113 and then supplies the amplitude fluctuation component to the FFT unit 115.

The FFT unit 115 converts a time domain signal into a frequency domain signal by performing fast Fourier transform processing (FFT processing) of the digital signal supplied from the ADC 114. The frequency domain signal acquired by the FFT unit 115 indicates the input level, for each frequency, of the amplitude fluctuation component supplied from the amplifier 113 to the ADC 114 and indicates the level of a quadrature error that can occur in the quadrature modulated signal. The FFT unit 115 supplies the acquired frequency domain signal to the malfunction determining unit 118 or the correction amount calculating unit 119 via the switch 117.

The switching control unit 116 starts execution of the malfunction determining processing at the time of activation of the wireless communication device 100, and the switching control unit 116 controls the switch 117 to connect the FFT unit 115 and the malfunction determining unit 118 and controls the switch 122 to connect the abnormal correction value storage unit 120 and the correction circuit 123. The switching control unit 116 starts execution of the calibration processing in response to input of a determination result indicating the absence of malfunction from the malfunction determining unit 118, and the switching control unit 116 controls the switch 117 to connect the FFT unit 115 and the correction amount calculating unit 119 and controls the switch 122 to connect the normal correction value storage unit 121 and the correction circuit 123.

The switch 117 switches the state where the FFT unit 115 and the malfunction determining unit 118 are connected and the state where the FFT unit 115 and the correction amount calculating unit 119 are connected under control of the switching control unit 116.

The malfunction determining unit 118 detects carrier leak and image leak of the frequency domain signal supplied from the FFT unit 115 when the malfunction determining unit 118 is connected to the FFT unit 115 via the switch 117 at the time of execution of the malfunction determining processing. Then, the malfunction determining unit 118 determines the presence or absence of malfunction of the wave detector 112 and the subsequent circuits (at least one of the wave detector 112, the amplifier 113, the ADC 114, and the FFT unit 115) on the basis of the input levels of the detected carrier leak and image leak to the ADC 114.

When a determination result indicating the presence of malfunction (hereinafter also referred to as a malfunction determination result) is obtained, the malfunction determining unit 118 supplies the malfunction determination result to an outside. When a determination result indicating the absence of malfunction is obtained, the malfunction determining unit 118 supplies the determination result to the switching control unit 116.

The correction amount calculating unit 119 calculates a correction amount on the basis of the carrier leak and the image leak of the frequency domain signal supplied from the FFT unit 115 and supplies the correction amount to the correction circuit 123 when the correction amount calculating unit 119 is connected to the FFT unit 115 via the switch 117 at the time of execution of the calibration processing.

The abnormal correction value storage unit 120 stores therein in advance an abnormal correction value (a first correction value) used at the time of execution of the malfunction determining processing. The abnormal correction value is a correction value that causes the output level of the ADC 114 to exceed a level expected during normal operation when the carrier leak and image leak of the modulated signal that has been corrected is input to the ADC 114. That is, the abnormal correction value is a correction value for causing (increases) a quadrature error in the modulated signal that has been corrected. For example, when a DC offset amount between differential signals of the I component and the Q component is equal to or larger than a desired AC amplitude, the abnormal correction value can be, for example, a correction value that doubles an amplitude difference between the I component and the Q component.

The normal correction value storage unit 121 stores therein in advance a table in which a normal correction value (a second correction value) used at the time of execution of the calibration processing and a correction amount are associated. The normal correction value storage unit 121 stores therein in advance a correction initial value.

The switch 122 switches the state where the abnormal correction value storage unit 120 and the correction circuit 123 are connected and the state where the normal correction value storage unit 121 and the correction circuit 123 are connected under control of the switching control unit 116.

The correction circuit 123 reads out the abnormal correction value stored in the abnormal correction value storage unit 120 when the correction circuit 123 is connected to the abnormal correction value storage unit 120 via the switch 122. The correction circuit 123 starts the malfunction determining processing by generating carrier leak and image leak in the modulated signal generated by the digital modulated signal generator 101 by using the abnormal correction value thus read out.

The correction circuit 123 reads out a normal correction value associated with a correction amount supplied from the correction amount calculating unit 119 by referring to the table stored in the normal correction value storage unit 121 when the correction circuit 123 is connected to the normal correction value storage unit 121 via the switch 122. Then, the correction circuit 123 executes calibration processing for performing correction suppressing the carrier leak and image leak of the modulated signal generated by the digital modulated signal generator 101 by using the normal correction value thus read out.

Figure 1:
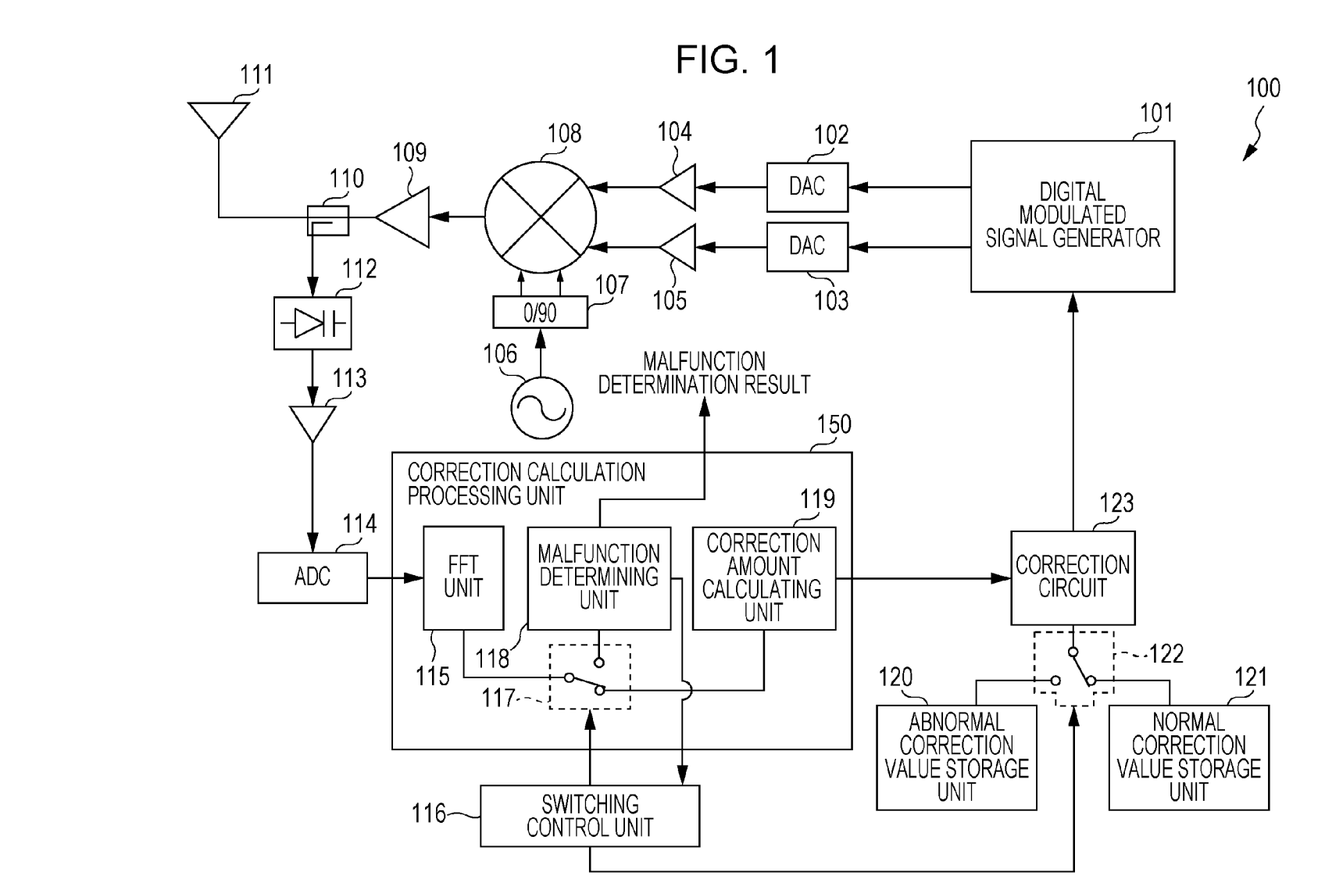
FIG. 1 illustrates a configuration of a wireless communication device according to Embodiment 1 of the present disclosure.

Note that the wireless communication device 100 includes a reception signal processing circuit that receives a reception signal and performs predetermined reception processing although the reception signal processing circuit is not illustrated in FIG. 1, and carrier leak and image leak of the reception signal are corrected in the reception signal processing circuit.

Operation of Wireless Communication Device

Figure 4:
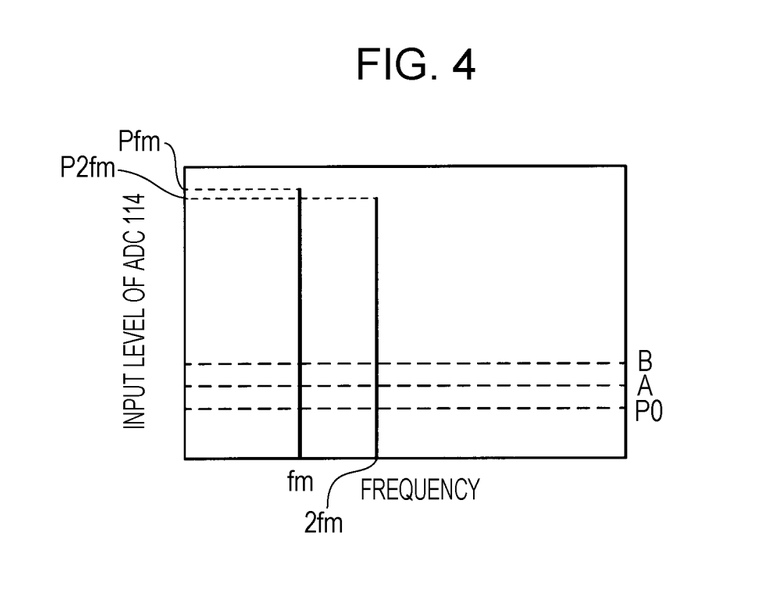
FIG. 4 illustrates a state where input levels of carrier leak and image leak to the ADC are maximum.
Figure 5:
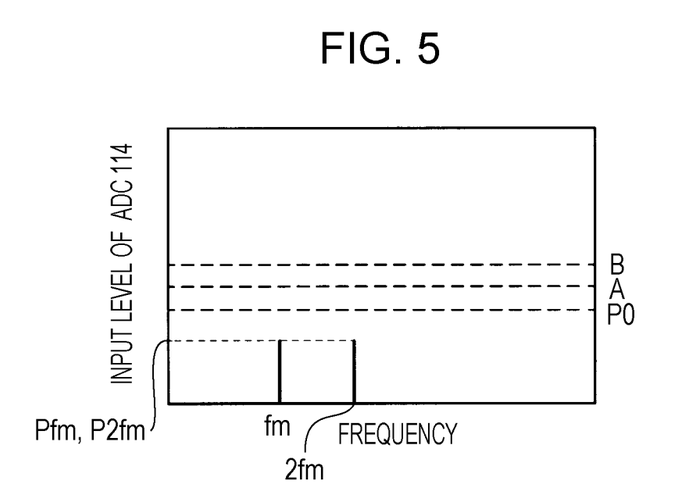
FIG. 5 illustrates a state where input levels of carrier leak and image leak to the ADC are equal to or lower than P0.
Figure 6:
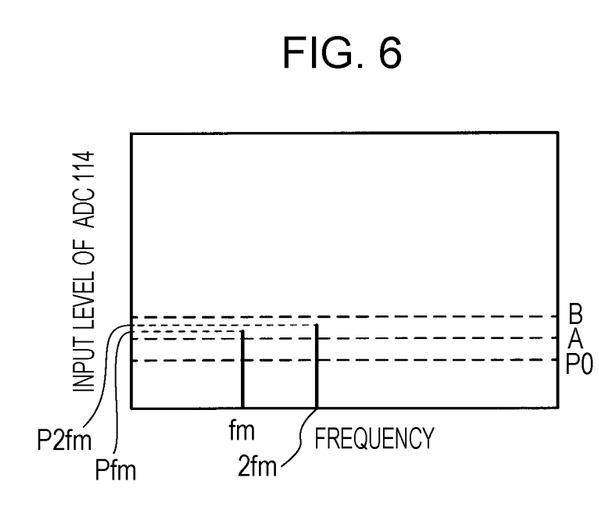
FIG. 6 illustrates a state where input levels of carrier leak and image leak to the ADC are lower than a threshold value B.

Next, operation of the wireless communication device 100 according to the present embodiment is described below in detail with reference to FIGS. 2 through 6. In FIGS. 4 through 6, P0 is a threshold value of an input level of an amplitude fluctuation component that can be detected by the ADC 114.

Figure 2:
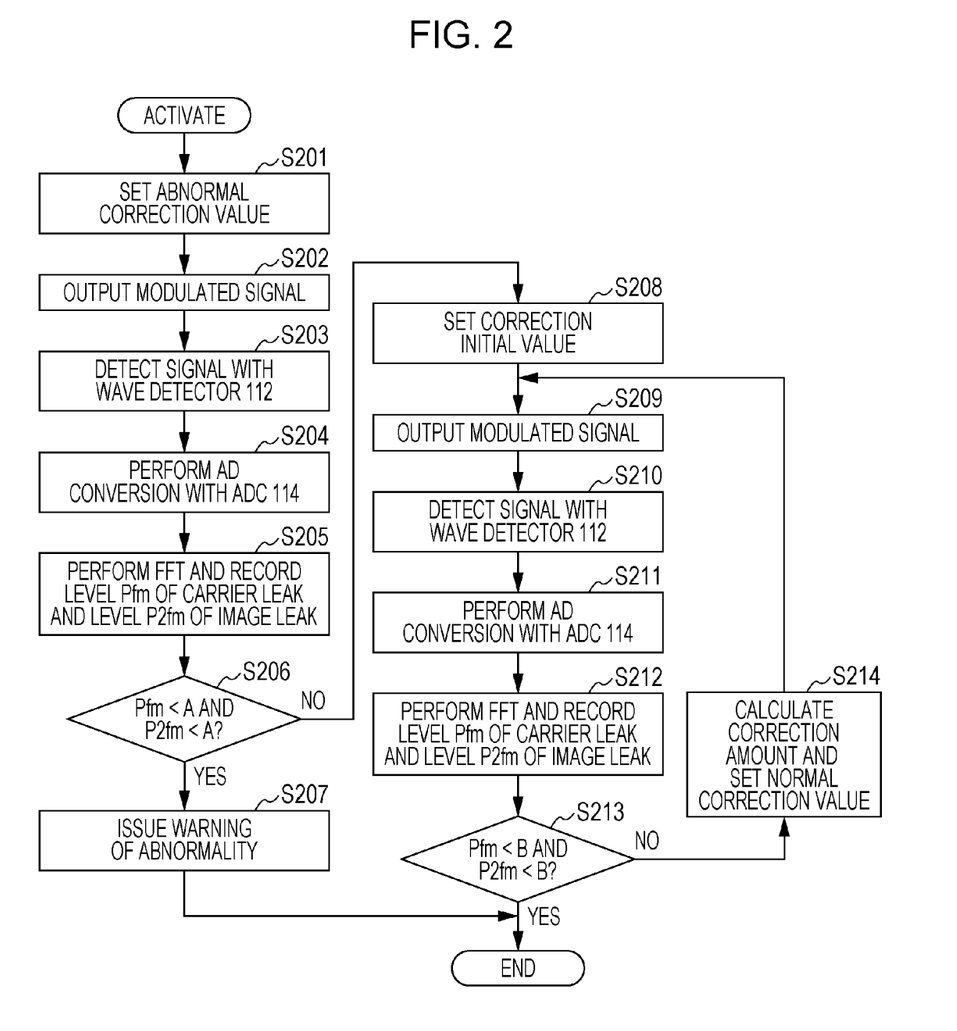
FIG. 2 illustrates operation of the wireless communication device according to Embodiment 1 of the present disclosure.

First, the wireless communication device 100 is activated by power supplied from a power source (not illustrated). This starts execution of the malfunction determining processing. At this point in time, the switching control unit 116 controls the switch 117 to connect the FFT unit 115 and the malfunction determining unit 118 and controls the switch 122 to connect the abnormal correction value storage unit 120 and the correction circuit 123.

When the correction circuit 123 is connected to the abnormal correction value storage unit 120 via the switch 122, the correction circuit 123 reads out an abnormal correction value stored in the abnormal correction value storage unit 120 and sets the abnormal correction value thus read out as a correction value (S201).

Next, the digital modulated signal generator 101 corrects a modulated signal by using the abnormal correction value set by the correction circuit 123. That is, the digital modulated signal generator 101 generates a modulated signal so that the output level of the ADC 114 exceeds a level expected during normal operation when carrier leak and image leak of the modulated signal that has been corrected are input to the ADC 114 (S202).

Next, the wave detector 112 acquires an amplitude fluctuation component by detecting a quadrature modulated signal supplied from the coupler 110 (S203).

Next, the ADC 114 acquires a digital signal by AD conversion of the amplitude fluctuation component acquired by detection in the wave detector 112 (S204).

Next, the FFT unit 115 performs fast Fourier transform processing of the digital signal acquired by the ADC 114 and records an output level Pfm of carrier leak of a frequency fm and an output level P2$fm$ of image leak of a frequency 2$fm$ (S205).

Next, the malfunction determining unit 118 determines whether or not the output level Pfm of the carrier leak is lower than a threshold value A and whether or not the output level P2$fm$ of the image leak is lower than the threshold value A (S206).

When the output level Pfm of the detected carrier leak is lower than the threshold value A and the output level P2$fm$ of the detected image leak is lower than the threshold value A (YES in S206), the malfunction determining unit 118 determines that the wireless communication device 100 has malfunction, and supplies the malfunction determination result to an outside.

Figure 3:
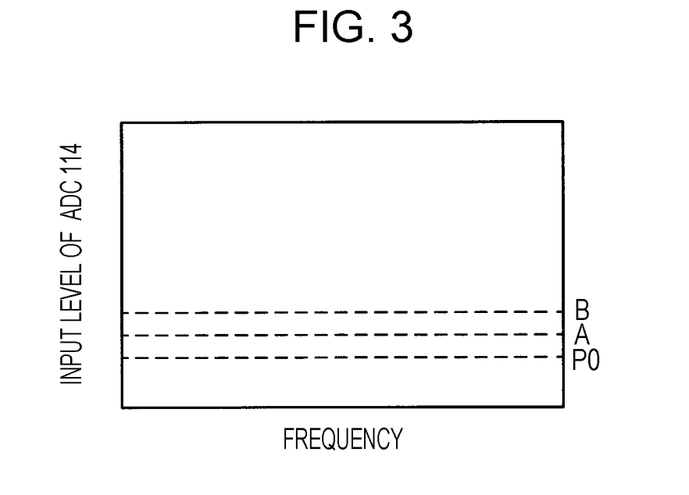
FIG. 3 illustrates a state where input levels of carrier leak and image leak to an ADC are "0"

When the wave detector 112 or the like has malfunction, an input level Pfm of carrier leak to the ADC 114 and an input level P2$fm$ of image leak to the ADC 114 are "0" as illustrated in FIG. 3.

The malfunction determination result supplied from the malfunction determining unit 118 is supplied to an external display device (not illustrated), and a user is notified and warned of the presence of malfunction of the wireless communication device 100 on the external display device (S207). Then, the processing is finished.

Meanwhile, when the output level Pfm of the detected carrier leak is equal to or higher than the threshold value A or the output level P2$fm$ of the detected image leak is equal to or higher than the threshold value A (NO in S206), the malfunction determining unit 118 determines that the wireless communication device 10 has no malfunction, and supplies a determination result indicating the absence of malfunction to the switching control unit 116.

In this case, the input level Pfm of the carrier leak to the ADC 114 and the input level P2$fm$ of the image leak to the ADC 114 become maximum as illustrated in FIG. 4.

Note that the presence or absence of malfunction can be determined in ST206 by inputting, to the ADC 114, the carrier leak and the image leak of the modulated signal corrected by using the abnormal correction value.

Upon receipt of the malfunction determination result indicating the absence of malfunction, the switching control unit 116 starts execution of calibration processing, and the switching control unit 116 switches the switch 117 to connect the FFT unit 115 and the correction amount calculating unit 119 and switches the switch 122 to connect the normal correction value storage unit 121 and the correction circuit 123.

When the correction circuit 123 is connected to the normal correction value storage unit 121 via the switch 122, the correction circuit 123 reads out a correction initial value from the normal correction value storage unit 121 and sets the correction initial value thus read out as a correction value (S208).

Next, the digital modulated signal generator 101 generates and outputs a modulated signal in which carrier leak and image leak have been corrected by using the normal correction value set by the correction circuit 123 (S209).

Next, the wave detector 112 acquires an amplitude fluctuation component by detecting a quadrature modulated signal supplied from the coupler 110 (S210).

Next, the ADC 114 acquires a digital signal by AD conversion of the amplitude fluctuation component acquired by detection in the wave detector 112 (S211).

Next, the FFT unit 115 performs fast Fourier transform processing of the digital signal acquired by the ADC 114 and records an output level Pfm of carrier leak of a frequency fm and an output level P2$fm$ of image leak of a frequency 2$fm$ (S212).

The correction amount calculating unit 119 determines whether or not the output level Pfm of the carrier leak is lower than a threshold value B and whether or not the output level P2$fm$ of the image leak is lower than the threshold value B (S213).

When the output level Pfm of the carrier leak is lower than the threshold value B and the output level P2$fm$ of the image leak is lower than the threshold value B (YES in S213), the correction amount calculating unit 119 determines that proper correction of the carrier leak and the image leak has been executed by the calibration processing, and supplies a calculation result indicating a correction amount "0" to the correction circuit 123. Then, the correction circuit 123 finishes execution of the calibration processing.

In this case, both of the input level Pfm of the carrier leak to the ADC 114 and the input level P2$fm$ of the image leak to the ADC 114 are lower than the threshold value B as illustrated in FIGS. 5 and 6.

Meanwhile, when the output level Pfm of the carrier leak is equal to or larger than the threshold value B or the output level P2$fm$ of the image leak is equal to or larger than the threshold value B (NO in S213), the correction amount calculating unit 119 calculates a correction amount for making the output level Pfm and the output level P2$fm$ lower than the threshold value B. Then, the correction amount calculating unit 119 supplies a calculation result indicating the calculated correction amount to the correction circuit 123.

Figure 7:
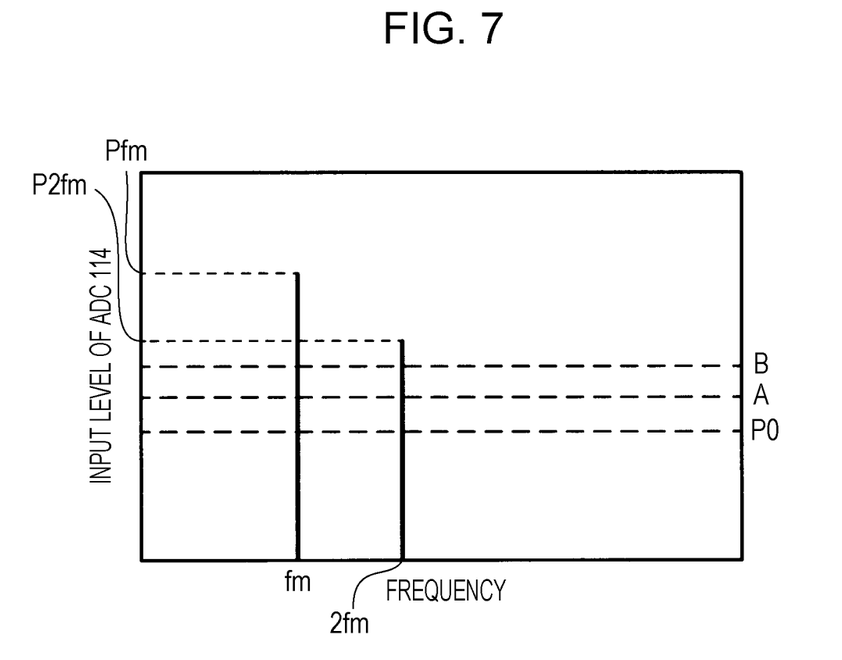
FIG. 7 illustrates a state where input levels of carrier leak and image leak to the ADC are equal to or higher than the threshold value B.

In this case, at least one of the input level Pfm of the carrier leak to the ADC 114 and the input level P2$fm$ of the image leak to the ADC 114 is equal to or larger than the threshold value B as illustrated in FIG. 7.

The correction circuit 123 reads out a normal correction value associated with the correction amount indicated by the calculation result supplied from the correction amount calculating unit 119 by referring to the table stored in the normal correction value storage unit 121 and sets the normal correction value thus read out as a correction value (S214). Then, the wireless communication device 100 proceeds to the processing in S209.

In this way, the wireless communication device 100 can distinguish the case of FIG. 5 or 6 in which the output levels of carrier leak and image leak are low due to proper correction of the carrier leak and the image leak from the case of FIG. 3 in which it is difficult to detect carrier leak and image leak due to malfunction of a function of correcting the carrier leak and the image leak.

As described above, the wireless communication device 100 according to the present embodiment includes the correction circuit 123 that outputs an abnormal correction value in malfunction determining processing and outputs a normal correction value in calibration processing and a malfunction determining unit 118 that detects levels of carrier leak and image leak in the malfunction determining processing and determines the presence or absence of malfunction of the wave detector 112 and subsequent circuits on the basis of the detected levels. According to the present embodiment, it is possible to distinguish a case where output levels of carrier leak and image leak are low due to execution of proper correction of the carrier leak and the image leak from a case where it is difficult to detect carrier leak and image leak due to malfunction of a function of correcting the carrier leak and the image leak by detecting malfunction of the function of correcting the carrier leak and the image leak.

Furthermore, according to the present embodiment, the correction circuit 123 can determine the presence or absence of a malfunction of a function of correcting carrier leak and image leak at every activation of the wireless communication device 100 by starting the malfunction determining processing at the time of activation of the wireless communication device 100.

Furthermore, according to the present embodiment, the correction circuit 123 can execute calibration processing after confirming that the function of correcting carrier leak and image leak has no malfunction by starting the calibration processing when a determination result indicating the absence of malfunction is obtained in the malfunction determining processing.

In the present embodiment, the malfunction determining processing is executed at the time of execution of the wireless communication device 100. Note, however, that the malfunction determining processing may be executed at a predetermined timing other than the time of activation of the wireless communication device 100.

Embodiment 2

Configuration of Wireless Communication Device

A configuration of a wireless communication device 800 which serves as a signal processing device according to Embodiment 2 of the present disclosure is described below in detail with reference to FIG. 8. Note that among constituent elements of the wireless communication device 800 illustrated in FIG. 8, constituent elements that are identical to those of the wireless communication device 100 illustrated in FIG. 1 are given identical reference signs and description thereof is omitted.

In the present embodiment, the wireless communication device 800 executes calibration processing for correcting carrier leak and image leak at the time of activation. When input levels of the carrier leak and the image leak to the ADC 114 are made lower than a target value in the calibration processing, the wireless communication device 800 executes malfunction determining processing for determining the presence or absence of malfunction of a correction function of correcting the carrier leak and the image leak.

Figure 8:
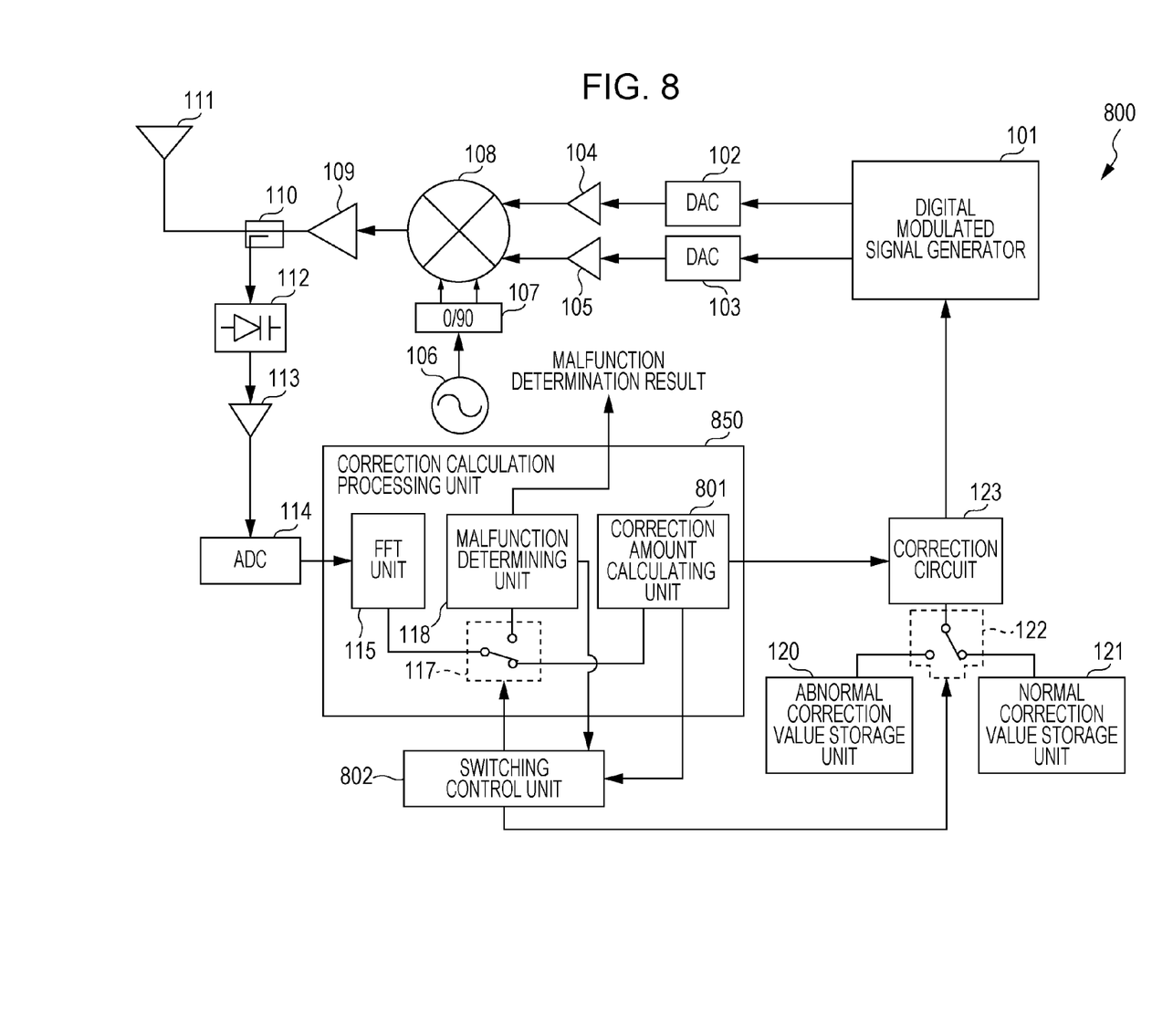
FIG. 8 illustrates a configuration of a wireless communication device according to Embodiment 2 of the present disclosure.

The wireless communication device 800 illustrated in FIG. 8 includes a switching control unit 802 and a correction amount calculating unit 801 instead of the switching control unit 116 and the correction amount calculating unit 119 of the wireless communication device 100 illustrated in FIG. 1. A FFT unit 115, a switch 117, a malfunction determining unit 118, and the correction amount calculating unit 801 constitute a correction calculation processing unit 850. The correction calculation processing unit 850 determines the presence or absence of malfunction by detecting carrier leak and image leak and calculates a correction amount for correcting the carrier leak and the image leak.

When input levels of carrier leak and image leak of a frequency domain signal to an ADC 114 are lower than a target value at the time of the first execution of the calibration processing, the correction amount calculating unit 801 supplies a switching signal for executing malfunction determining processing to the switching control unit 802. The correction amount calculating unit 801 calculates a correction amount on the basis of input levels, to the ADC 114, of carrier leak and image leak of a frequency domain signal supplied from the FFT unit 115 via the switch 117 at the time of the second or later execution of the calibration processing and supplies the correction amount to the correction circuit 123.

At the time of activation or upon receipt of a determination result indicating the absence of malfunction from the malfunction determining unit 118, the switching control unit 802 starts execution of the calibration processing, and the switching control unit 802 controls the switch 117 to connect the FFT unit 115 and the correction amount calculating unit 801 and controls a switch 122 to connect a normal correction value storage unit 121 and the correction circuit 123.

Upon receipt of the switching signal from the correction amount calculating unit 801, the switching control unit 802 starts execution of the malfunction determining processing, and the switching control unit 802 controls the switch 117 to connect the FFT unit 115 and the malfunction determining unit 118 and controls the switch 122 to connect an abnormal correction value storage unit 120 and the correction circuit 123.

Upon receipt of a determination result indicating the absence of malfunction from the malfunction determining unit 118, the switching control unit 802 starts execution of the calibration processing, and the switching control unit 802 controls the switch 117 to connect the FFT unit 115 and the correction amount calculating unit 801 and controls the switch 122 to connect the normal correction value storage unit 121 and the correction circuit 123.

The switch 117 switches the state where the FFT unit 115 and the malfunction determining unit 118 are connected and the state where the FFT unit 115 and the correction amount calculating unit 801 are connected under control of the switching control unit 802.

When a determination result indicating the absence of malfunction is obtained, the malfunction determining unit 118 supplies the determination result indicating the absence of malfunction to the switching control unit 802. Note that functions of the malfunction determining unit 118 other than those described above are identical to those in Embodiment 1.

The switch 122 switches the state where the abnormal correction value storage unit 120 and the correction circuit 123 are connected and the state where the normal correction value storage unit 121 and the correction circuit 123 are connected under control of the switching control unit 802.

When the correction circuit 123 is connected to the normal correction value storage unit 121 via the switch 122, the correction circuit 123 reads out a normal correction value associated with a correction amount supplied from the correction amount calculating unit 801 by referring to a table stored in the normal correction value storage unit 121. The correction circuit 123 executes calibration processing for performing correction suppressing carrier leak and image leak of a modulated signal generated by a digital modulated signal generator 101 by using the normal correction value thus read out. Note that functions of the correction circuit 123 other than those described above are identical to those in Embodiment 1.

Operation of Wireless Communication Device

Figure 9:
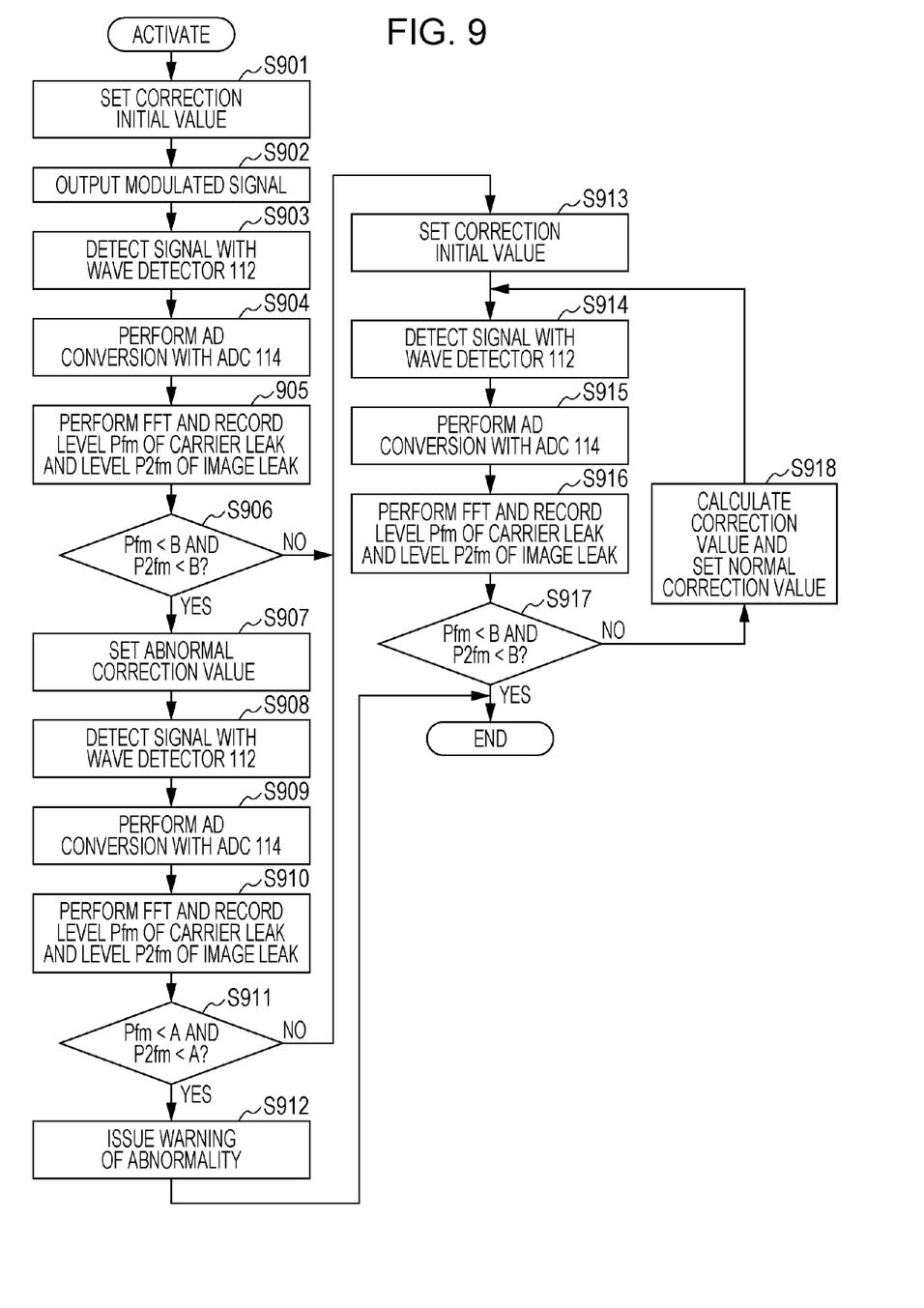
FIG. 9 illustrates operation of the wireless communication device according to Embodiment 2 of the present disclosure.

Next, operation of the wireless communication device 800 according to the present embodiment is described below in detail with reference to FIG. 9.

First, the wireless communication device 800 is activated by power supplied from a power source (not illustrated). This starts execution of the calibration processing. At this point in time, the switching control unit 802 controls the switch 117 to connect the FFT unit 115 and the correction amount calculating unit 801 and controls the switch 122 to connect the normal correction value storage unit 121 and the correction circuit 123.

When the correction circuit 123 is connected to the normal correction value storage unit 121 via the switch 122, the correction circuit 123 reads out a correction initial value from the normal correction value storage unit 121 and sets the correction initial value thus read out as a correction value (S901).

Next, the digital modulated signal generator 101 generates and outputs a modulated signal in which carrier leak and image leak have been corrected by using the correction initial value set by the correction circuit 123 (S902).

Next, the wave detector 112 acquires an amplitude fluctuation component by detecting a quadrature modulated signal supplied from the coupler 110 (S903).

Next, the ADC 114 acquires a digital signal by AD conversion of the amplitude fluctuation component acquired by detection in the wave detector 112 (S904).

Next, the FFT unit 115 performs fast Fourier transform processing of the digital signal acquired by the ADC 114 and records an output level Pfm of carrier leak of a frequency fm and an output level P2$fm$ of image leak of a frequency 2$fm$ (S905).

Next, the correction amount calculating unit 801 determines whether or not the output level Pfm of the carrier leak is lower than a threshold value B and whether or not the output level P2$fm$ of the image leak is lower than the threshold value B which is a target value (S906).

When the output level Pfm of the carrier leak is lower than the threshold value B and the output level P2$fm$ of the image leak is lower than the threshold value B at the time of the first execution of the calibration processing (YES in S906), the correction amount calculating unit 801 supplies a switching signal to the switching control unit 802.

In response to this, the switching control unit 802 switches the switch 117 to connect the FFT unit 115 and the malfunction determining unit 118 and switches the switch 122 to connect the abnormal correction value storage unit 120 and the correction circuit 123.

When the correction circuit 123 is connected to the abnormal correction value storage unit 120 via the switch 122, the correction circuit 123 reads out an abnormal correction value stored in the abnormal correction value storage unit 120 and sets the abnormal correction value thus read out as a correction value (S907).

Next, the digital modulated signal generator 101 corrects a modulated signal by using the abnormal correction value set by the correction circuit 123. That is, the digital modulated signal generator 101 generates a modulated signal that causes an output level of the ADC 114 to exceed a level expected during normal operation when carrier leak and image leak of the modulated signal that has been corrected are input to the ADC 114 (S908).

Next, the wave detector 112 acquires an amplitude fluctuation component by detecting a quadrature modulated signal supplied from the coupler 110. The ADC 114 acquires a digital signal by AD conversion of the amplitude fluctuation component acquired by detection in the wave detector 112 (S909).

Next, the FFT unit 115 performs fast Fourier transform processing of the digital signal acquired by the ADC 114 and records an output level Pfm of carrier leak of a frequency fm and an output level P2$fm$ of image leak of a frequency 2$fm$ (S910).

Next, the malfunction determining unit 118 determines whether or not the output level Pfm of the carrier leak is lower than a threshold value A and whether or not the output level P2$fm$ of the image leak is lower than the threshold value A (S911).

When the output level Pfm of the detected carrier leak is lower than the threshold value A and the output level P2$fm$ of the detected image leak is lower than the threshold value A (YES in S911), the malfunction determining unit 118 determines the presence of malfunction of the wireless communication device 800 and supplies the malfunction determination result to an outside.

The malfunction determination result supplied from the malfunction determining unit 118 is supplied to an external display device (not illustrated), and a user is notified and warned of the presence of malfunction of the wireless communication device 100 on the external display device (S912). Then, the processing is finished.

Meanwhile, when the output level Pfm of the detected carrier leak is equal to or higher than the threshold value A or the output level P2$fm$ of the detected image leak is equal to or higher than the threshold value A (NO in S911), the malfunction determining unit 118 determines that the wireless communication device 800 has no malfunction and supplies the determination result indicating the absence of malfunction to the switching control unit 802.

Upon receipt of the determination result indicating the absence of malfunction, the switching control unit 802 starts execution of the calibration processing again, and the switching control unit 802 switches the switch 117 to connect the FFT unit 115 and the correction amount calculating unit 801 and switches the switch 122 to connect the normal correction value storage unit 121 and the correction circuit 123.

When the correction circuit 123 is connected to the normal correction value storage unit 121 via the switch 122, the correction circuit 123 reads out a correction initial value from the normal correction value storage unit 121 and sets the correction initial value thus read out as a correction value (S913).

Next, the digital modulated signal generator 101 generates and outputs a modulated signal in which carrier leak and image leak have been corrected by using the correction initial value set by the correction circuit 123. Then, the wave detector 112 acquires an amplitude fluctuation component by detecting a quadrature modulated signal supplied from the coupler 110 (S914).

Next, the ADC 114 acquires a digital signal by AD conversion of the amplitude fluctuation component acquired by detection in the wave detector 112 (S915).

Next, the FFT unit 115 performs fast Fourier transform processing of the digital signal acquired by the ADC 114 and records an output level Pfm of carrier leak of a frequency fm and an output level P2$fm$ of image leak of a frequency 2$fm$ (S916).

The correction amount calculating unit 801 determines whether or not the output level Pfm of the carrier leak is lower than a threshold value B and whether or not the output level P2$fm$ of the image leak is lower than the threshold value B (S917).

When the output level fm of the carrier leak is lower than the threshold value B and the output level 2$fm$ of the image leak is lower than the threshold value B (YES in S917), the correction amount calculating unit 801 determines that this is due to execution of proper correction for suppressing the carrier leak and the image leak in the calibration processing and supplies a calculation result indicating a correction amount "0" to the correction circuit 123. Then, the correction circuit 123 finishes execution of the calibration processing.

Meanwhile, when the output level Pfm of the carrier leak is equal to or higher than the threshold value B or the output level P2$fm$ of the image leak is equal to or higher than the threshold value B (NO in S917), the correction amount calculating unit 801 calculates a correction amount for making the output level Pfm and the output level P2$fm$ lower than the threshold value B. Then, the correction amount calculating unit 801 supplies a calculation result indicating the calculated correction amount to the correction circuit 123.

The correction circuit 123 reads out a normal correction value associated with the correction amount indicated by the calculation result supplied from the correction amount calculating unit 801 by referring to the table stored in the normal correction value storage unit 121 and sets the normal correction value thus read out as a correction value (S918). Then, the digital modulated signal generator 101 generates and outputs a modulated signal in which carrier leak and image leak have been corrected by using the normal correction value set by the correction circuit 123. Then, the wireless communication device 800 proceeds to processing in S914.

When the output level Pfm of the carrier leak is equal to or higher than the threshold value B or the output level P2$fm$ of the image leak is equal to or higher than the threshold value B at the time of the first execution of the calibration processing (NO in S906), the correction amount calculating unit 801 maintains the state where the normal correction value storage unit 121 and the correction circuit 123 are connected without switching the switch 122. Then, the wireless communication device 800 skips the processing in S907 through S912 and proceeds to the processing in S913.

As described above, the wireless communication device 800 includes the correction circuit 123 that outputs an abnormal correction value in the malfunction determining processing and outputs a normal correction value in the calibration processing and the malfunction determining unit 118 that detects levels of carrier leak and image leak in the malfunction determining processing and determines the presence or absence of malfunction of the wave detector 112 and subsequent circuits on the basis of the detected levels. According to the present embodiment, it is possible to distinguish a case where output levels of carrier leak and image leak are low due to proper correction of the carrier leak and the image leak from a case where it is difficult to detect carrier leak and image leak due to malfunction of a function of correcting the carrier leak and the image leak by detecting malfunction of the function of correcting the carrier leak and the image leak.

Furthermore, according to the present embodiment, the correction circuit 123 performs calibration processing at the time of activation of the wireless communication device 800, and when carrier leak and image leak are made equal to or lower than a target value, the correction circuit 123 starts the malfunction determining processing. This makes it possible to distinguish, after suppression of the carrier leak and the image leak, a case where output levels of carrier leak and image leak are low due to proper correction of the carrier leak and the image leak from a case where it is difficult to detect carrier leak and image leak due to malfunction of a function of correcting the carrier leak and the image leak.

Furthermore, according to the present embodiment, after a determination result indicating the absence of malfunction is obtained by executing the malfunction determining processing one time, the calibration processing is executed again, and the malfunction determining processing is not executed after that. It is therefore possible to minimize a delay of the calibration processing caused by execution of the malfunction determining processing.

Furthermore, according to the present embodiment, the malfunction determining processing is executed when output levels of carrier leak and image leak are lower than the threshold value B at the time of the first execution of the calibration processing, and the malfunction determining processing is not executed even when the output levels of the carrier leak and the image leak are lower than the threshold value B in the subsequent calibration processing. It is therefore possible to reduce the possibility of execution of the malfunction determining processing when the calibration processing has been properly executed and there is no malfunction.

Note that in the present disclosure, types, layouts, the number, etc. of members are not limited to those described in the above embodiments and can be changed as appropriate within the scope of the disclosure. For example, the constituent elements may be replaced as appropriate by those that produce similar effects.

Specifically, in the above embodiments, a threshold value (the threshold value A) to be compared with input levels of carrier leak and image leak corrected by using an abnormal correction value and a threshold value (the threshold value B) to be compared with input levels of carrier leak and image leak corrected by using a normal correction value are different from each other, but these threshold values may be identical to each other in the present disclosure.

In the above embodiments, an example where the malfunction determining processing is executed in the calibration processing has been described. However, the present disclosure is not limited to this and can be applied to malfunction determining processing in various kinds of signal processing. For another example, the malfunction determining processing of the present disclosure can be also applied to an example where phases of a plurality of transmission branches are adjusted, an example where antenna side lobe in beam synthesis caused by amplitude adjustment is optimized, an example of automatic transmission output adjustment (APC) using adjustment of VGA gain for transmission, an example where unnecessary radiation that is out of a transmission band is adjusted by cutoff adjustment of transmission LPF, an example where reception DC offset is adjusted, an example where gain of a plurality of reception branches is adjusted, or an example where phases of a plurality of reception branches are adjusted.

In the above embodiments, an example where a millimeter-wave band signal is processed has been described. However, the present disclosure is not limited to this and can be applied to another example where a signal, such as a microwave band signal, other than a millimeter-wave band signal is processed.

Various embodiments have been described above with reference to the drawings. Needless to say, however, the present disclosure is not limited to such examples. It is evident that a person skilled in the art can arrive at various changes and modifications within the scope of the claims, and it is understood that such changes and modifications are also encompassed within the technical scope of the present disclosure. The constituent elements described in the above embodiments may be combined in any way within the scope of the disclosure.

In the above embodiments, an example in which the present disclosure is realized by using hardware has been described. However, the present disclosure can be also realized by using software in combination with hardware.

Each of the functional blocks used for description of the above embodiments is typically realized as an LSI which is an integrated circuit. The integrated circuit may control the functional blocks used for description of the above embodiments and include an input and an output. These functional blocks may be realized as individual chips or some or all of the constituent elements may be realized as a single chip. The term "LSI" is used, but the term "IC", "system LSI", "super LSI", or "ultra LSI" may be used depending on the degree of integration.

Furthermore, means to achieve integration is not limited to an LSI and may be a special circuit or a general-purpose processor. An FPGA (Field Programmable Gate Array) that can be programmed after production of an LSI or a reconfigurable processor in which connection or setting of circuit cells inside an LSI can be reconfigured can be also used.

If a technique of integration circuit that replaces an LSI appears in the future as a result of advancement of the semiconductor technique or appearance of another technique deriving from the semiconductor technique, integration of the functional blocks can be achieved by using such a technique. One possibility is application of a biotechnology or the like.

The present disclosure can be used for signal processing (malfunction determining processing) in a wireless communication device or the like that corrects a quadrature error that occurs in quadrature modulation of a signal.

What is claimed is:

1. A signal processing device comprising:
   a generator that generates a quadrature modulated signal by correcting a modulated signal using a correction value, the correction value being one of a first correction value that suppresses a quadrature error and a second correction value that causes the quadrature error;
   a detector that detects the quadrature error of the quadrature modulated signal; and
   malfunction determination circuitry that determines presence or absence of malfunction of the detector on the basis of a level of the quadrature error.

2. The signal processing device according to claim 1, wherein
   the generator generates an analog signal by digital/analog conversion of the modulated signal corrected by using the correction value and generates the quadrature modulated signal by quadrature modulation of the analog signal.

3. The signal processing device according to claim 1, wherein
   the detector acquires an amplitude fluctuation component of the quadrature modulated signal and detects the quadrature error on the basis of the amplitude fluctuation component.

4. The signal processing device according to claim 1, wherein
   the detector acquires an amplitude fluctuation component of the quadrature modulated signal, generates a digital signal by analog/digital conversion of the amplitude fluctuation component, and detects the quadrature error on the basis of the digital signal.

5. The signal processing device according to claim 1, wherein
   the generator includes:
   a signal generator that generates the modulated signal corrected by using the correction value;
   a DA converter that generates an analog signal by digital/analog conversion of the modulated signal; and
   a quadrature modulator that generates the quadrature modulated signal by quadrature modulation of the analog signal,
   the detector includes:
   a wave detector that acquires an amplitude fluctuation component by detecting the quadrature modulated signal;
   an AD converter that generates a digital signal by analog/digital conversion of the amplitude fluctuation component; and
   an FFT that detects the quadrature error on the basis of the digital signal, and
   the malfunction determination circuitry determines presence or absence of malfunction of the wave detector or the AD converter.

6. The signal processing device according to claim 1, wherein
   the generator uses the second correction value as the correction value at the time of activation of the wireless communication device.

7. The signal processing device according to claim 1, wherein
   the generator uses the first correction value as the correction value when the malfunction determination circuitry determines that there is no malfunction.

8. The signal processing device according to claim 1, wherein
   the generator uses the second correction value as the correction value at the time of activation of the wireless communication device; and
   the generator uses the first correction value as the correction value when the malfunction determination circuitry determines that there is malfunction.

9. The signal processing device according to claim 1, wherein
   the generator uses the first correction value as the correction value at the time of activation of the wireless communication device; and
   the generator uses the second correction value as the correction value when the level of the quadrature error is lower than a predetermined value.

10. The signal processing device according to claim 1, wherein
    the first correction value is for making the level of the quadrature error lower than a predetermined value, and the second correction value is for making the level of the quadrature error equal to or higher than a predetermined value.

11. A wireless communication device comprising:
    circuitry that generates a quadrature modulated signal; and
    a transmitter that transmits the quadrature modulated signal,
    the circuitry being operative to:
    generate a quadrature modulated signal by correcting a modulated signal using a correction value, the correction value being one of a first correction value that suppresses a quadrature error and a second correction value that causes the quadrature error;
    detect the quadrature error of the quadrature modulated signal; and
    determine presence or absence of malfunction in a detection of the quadrature error on the basis of a level of the quadrature error.

12. A method for determining presence or absence of malfunction, comprising:
    generating a quadrature modulated signal by correcting a modulated signal using a correction value, the correction value being one of a first correction value that suppresses a quadrature error and a second correction value that causes the quadrature error;

detecting the quadrature error of the quadrature modulated signal; and determining presence or absence of malfunction in the detecting of the quadrature error on the basis of a level of the quadrature error.

* * * * *